PHONOGRAPHIC ARM AND MOUNTING MEANS

Filed Oct. 1, 1962

INVENTOR.
JAMES T. BALOGHY
BY James H. Conner
AGENT.

United States Patent Office 3,297,830
Patented Jan. 10, 1967

3,297,830
PHONOGRAPHIC ARM AND MOUNTING MEANS

James T. Baloghy, Commack, N.Y.
(580 Willis Ave., Williston Park, N.Y. 11596)

Filed Oct. 1, 1962, Ser. No. 227,133
3 Claims. (Cl. 179—100.4)

This invention relates generally to phonograph pick-up arm mounts and in particular to a phonograph pick-up arm mounting means having electrical conducting means that effectively connects the cartridge to the amplifier without introducing, disturbing and distorting torque resistance during the arcuate travel of the arm across the face of a record.

Heretofore, phonograph pick-up cartridges, regardless of the type (reluctance, crystal, magnetic, or others) were electrically connected through the arm mount by means of wire conductors. Even though the wire utilized was of a light gauge, a certain resistance to the free movement of the needle in the record grooves resulted. With the advent of micro-groove long playing recordings, the arm resistance resulting from the wire conductors introduced serious disturbances, such as track jumping and uneven groove wear. Further, stereophonic pick-up heads required multiple wire conductors which amplified the arm pivot resistance. The present invention overcomes these serious disadvantages and provides multiple electrical connections from the pick-up to the amplifier without any substantial resistance to the pivotal movement of the arm during the pick-up movement across the grooved face of a record.

Accordingly, one of the principal objects of the invention resides in the provision of novel electrical connection means between the pick-up of a phono-arm and the amplifier that substantially eliminates torsional resistance to the pivotal movement of a tracking phono-arm.

Another object of the invention resides in the provision of a phonograph arm mounting means that permits the tracking of a record at stylus pressures lower than herebefore available to substantially eliminate wear of the record groove.

Yet another object of the invention is to provide in a phonograph arm mount, means to permit substantially instantaneous removal of the arm from its base without requiring manually disconnecting wires or mechanical components to visually inspect the stylus and permit substantially instantaneous re-engagement of the arm with its base and electrical connections for operational use of the phono-arm.

Other ancillary objects will be in part hereinafter described and will be in part hereinafter apparent.

Figure 1:
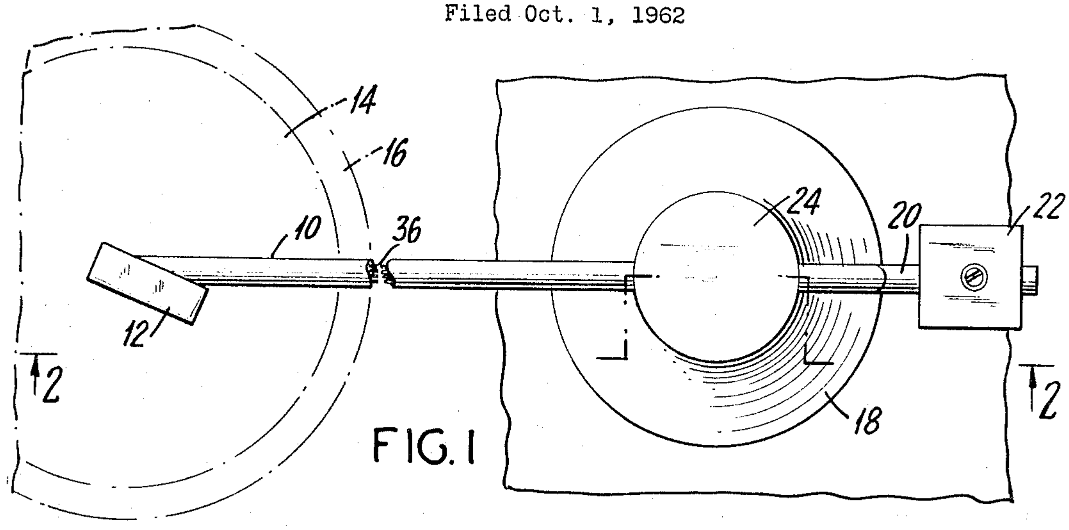
FIGURE 1 is a plan view of the novel phonograph arm.
Figure 2:
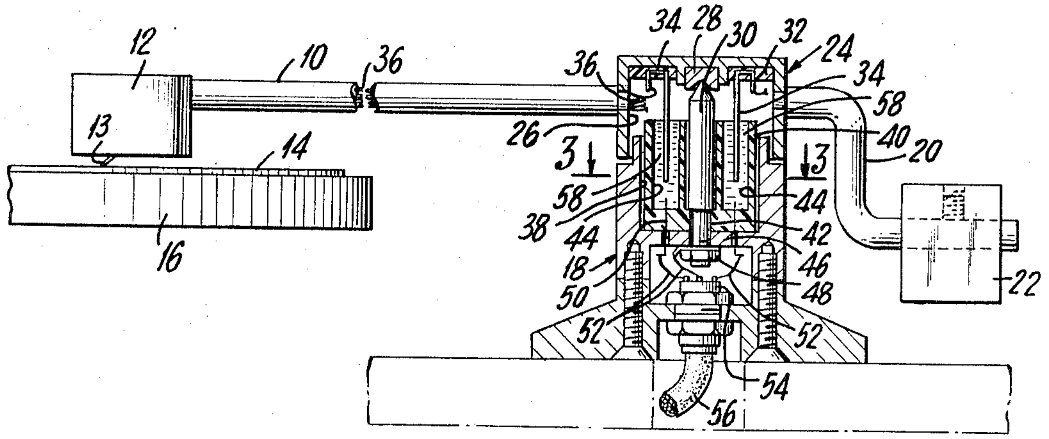
FIGURE 2 is a cross sectioned view taken along line 2—2 of FIGURE 1.
Figure 3:
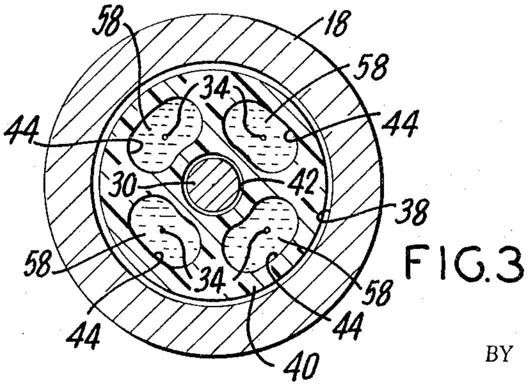
FIGURE 3 is a cross-sectioned view taken along line 3—3 of FIGURE 2.

Referring to the drawing in detail, 10 generally designates the phonograph arm, having a reproducing head 12 disposed at one end thereof. Head 12 may have any conventional pick-up cartridge secured therein. Pick-up cartridges are well known to those skilled in the art and per se form no part of the present invention. Briefly, a needle or stylus 13 projects from the cartridge and engages the preformed grooves of a record 14 disposed on a rotating turntable 16. The stylus 13 transmits mechanical vibrations or modulations pre-formed in the record groove to the pick-up cartridge in head 12. The cartridge converts the mechanical vibrations into electrical values which are amplified and eventually reproduced audibly. To follow the conventional spiral grooving of conventional records, the arm 10 pivots on its base 18.

It is essential that stylus 13 have a minimum of pressure on the record 14. Therefore, arm 10 is provided with an oppositely extending counter-balance arm 20 having an adjustable poise 22 thereon. Thus, poise 22 permits a minimum of pressure to be exerted on the record 14 by stylus 13. Since the stylus tracks or rides in extremely shallow conventional grooves, a minimum pressure is required to maintain the stylus in the groove. Resistance to the free pivotal movement of the arm-held stylus predicates an increase in stylus pressure to avoid undesirable groove skipping or jumping of the stylus during the playing of the record. This required pressure increase, damages the stylus and record through wear, etc. The present invention eliminates the increased pressure requirement and permits the stylus to follow or track the record grooves without skipping or jumping with a minimum of stylus pressure. Thus, record wear is substantially reduced and a higher fidelity of ultimate audible reproduction is possible. Heretofore, wire conductors from the pick-up head introduced torsional resistance to the pivotal movement of the phonograph arm and required the aforesaid increased tracking stylus pressure to retain the stylus in the groove. Means are provided to eliminate the wire conductor induced resistance and directed toward this end is a cap 24 having an internal recess 26. Secured to the cap 24 and horizontally extending therefrom is arm 10. Diametrically oppositely extending from cap 24 is the counter-balance 20. Centrally located in the recess 26 of cap 24 is a conical recessed bearing member 28 adapted to be engaged by a pivot pin 30, hereinafter described. Also secured to cap 24 in recess 26 is an electrically insulated bushing 32 that supports plural electrodes 34. Electrodes 34 are equidistantly spaced one from the other and depend downwardly from bushing 32. Each electrode 34 is connected to a conductor 36 which is in turn connected to the pick-up reproducing head 12. In monaural systems two electrodes 34 and two conductors 36 are provided; while in stereo systems four electrodes 34 and four conductors 36 are provided.

Disposed within a recess 38 in base 18 is an electrically insulated member 40 having a central vertical through aperture 42 and plural equidistantly spaced and radially disposed wells 44 provided for a purpose hereinafter appearing.

Disposed within aperture 42 is pivot pin 30 which is secured at one end to a transverse annular rib 46 in base 18 as by a nut 48. Pivot pin 30 projects upwardly above the member 40 and is adapted to reside within the conical recess in bearing 28 affixed to cap 24. Thus, cap 24 effectively pivots on the pin 30 in a substantially balanced relationship. When cap 24 is disposed on pin 30, the electrodes 34 project downwardly into the complementally located wells 44 in insulated member 40. Each of the wells 44 is provided with a through connector 50 which extends from the lower interior of the well in sealed relation through the member 40. Conductors 52 are connected to the respective connectors 50 and in turn through cable socket 54 and cable 56 to an amplifier, not shown.

Adapted to be disposed within wells 44 is an electrically conducting fluid 58 which contacts the electrodes 34. Fluids such as potassium iodide in methanol and glycerine or mercury may be utilized in the wells. It will be understood that the diametrical dimensions of wells 44 are such to permit a limited predetermined pivotal movement of electrodes 34 therein. This predetermined movement is sufficient to permit arm 10 to traverse the conventional recording 14.

The generated voltages in pick-up head 12 readily pass through conductors 36, electrodes 34, fluid 58, connectors 50, conductors 52, and cable 56 to modulate the conventional amplifier, not shown.

Conventionally, conductors between phonograph pick-up heads of the type disclosed herein and amplifiers are grounded to eliminate and prevent extraneous stray electro-magnetic waves from introducing undesirable noise or distortion. The conventional conductors are shielded and the shield is grounded to the amplifier chassis or the like. In the present invention, the pin 30 is grounded by a ground-connected conductor 52. Pin 30 conducts the grounded relation through bearing 28 to the arm 10 which effectively shields the conductors 36 and the electrodes 34. Obviously, cable 56 is shielded in an analogous manner.

Thus, the immersed electrodes 34 do not in any way retard the pivotal action of arm 10 in traversing record 14. As a result of the lack of friction or resistance generally caused by conventional wire conductors, tracking pressure of stylus 13 can be reduced to minimum heretobefore unobtainable in conventional phonograph arms.

While there has been shown and described a single embodiment of the invention, it will be understood that modifications and changes could be made without departing from the scope of the invention, as defined in the following claims.

The invention claimed is:

1. In a base for mounting a phonograph arm, an electrically insulated member, a pivot pin vertically projecting above said member, and adapted to engage bearing means in said arm to pivot said arm on said pin, a plurality of arcuately shaped recesses in said member, a plurality of electrodes, each being connected to the output circuit of a pick-up head mounted on said arm, said electrodes being electrically insulated one from the other and disposed from said arm in depending equally spaced relation, and said electrodes being adapted to be positioned in the respective recesses in said member, a conductor connected to each respective recess, and electrically conducting liquid means disposed in each recess to electrically connect the electrode with the conductor as said arm pivots on the pivot pin and the depending electrodes move in said arcuate recesses.

2. In a switch for electrically connecting a movable phonograph arm to a fixed arm supporting base, an insulated member having plural spaced arcuately shaped wells electrically insulated one from the other, a fixed electrode in each of said wells, plural electrodes mounted on said arm and movable with the arm through the arc of the arcuate wells, each of said arm electrodes being disposed in a respective well and spaced from the fixed electrodes in said well, and electrolytic means disposed in said wells to electrically connected said movable electrode with the respective fixed electrodes.

3. In a switch for electrically connecting a movable phonograph arm to a fixed arm supporting base, an insulated member having plural spaced arcuately shaped wells electrically insulated one from the other, a fixed electrodes in each of said wells, plural electrodes mounted on said arm and movable with the arm, each of said arm electrodes being disposed in a respective well and spaced from the fixed electrode in said well and movable through the arc of the well, and electrolytic means disposed in said wells to electrically connect said movable electrode with the respective fixed electrodes, and each of said wells having an arcuate diameter greater than the maximum movement of the respective arm electrodes in said wells, and the electrode movement being proportional to the movement of the arm as the arm traverses a record.

References Cited by the Examiner

UNITED STATES PATENTS

| | | | |
|---|---|---|---|
| 1,792,973 | 2/1931 | Frenz | 339—118 |
| 2,012,771 | 8/1935 | Reynolds | 339—118 |

BERNARD KONICK, *Primary Examiner.*

IRVING SRAGOW, *Examiners.*

R. J. GARBACIK, T. W. FEARS, *Assistant Examiners.*